(12) United States Patent
Huang et al.

(10) Patent No.: US 10,935,520 B2
(45) Date of Patent: Mar. 2, 2021

(54) METHOD FOR RECONSTRUCTING DEFECT

(71) Applicant: Tsinghua University, Beijing (CN)

(72) Inventors: Songling Huang, Beijing (CN); Wei Zhao, Beijing (CN); Lisha Peng, Beijing (CN); Shen Wang, Beijing (CN); Di Cheng, Beijing (CN); Jiarui Dong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 235 days.

(21) Appl. No.: 15/910,433

(22) Filed: Mar. 2, 2018

(65) Prior Publication Data

US 2018/0275099 A1   Sep. 27, 2018

(30) Foreign Application Priority Data

Mar. 22, 2017   (CN) .......................... 201710174666.2

(51) Int. Cl.
*G01N 27/83* (2006.01)
*G06F 111/10* (2020.01)
*G06F 30/20* (2020.01)
*G01N 17/00* (2006.01)
*G06F 30/23* (2020.01)

(52) U.S. Cl.
CPC ............. *G01N 27/83* (2013.01); *G06F 30/20* (2020.01); *G01N 17/006* (2013.01); *G06F 30/23* (2020.01); *G06F 2111/10* (2020.01)

(58) Field of Classification Search
CPC ............................... G01N 27/83; G01N 27/87
See application file for complete search history.

(56) References Cited

U.S. PATENT DOCUMENTS

2018/0266992 A1* 9/2018 Liu ........................ G01R 33/10

OTHER PUBLICATIONS

Maryam Ravan, Reza Khalaj Amineh, Slawomir Koziel, Natalia K. Nikolova, and James P. Rei, Sizing of 3-D Arbitrary Defects Using Magnetic Flux Leakage Measurements, IEEE Transactions on Magnetics, vol. 46, No. 4, Apr. 2010 (Year: 2010).*

* cited by examiner

*Primary Examiner* — Matthew G Marini
(74) *Attorney, Agent, or Firm* — Hodgson Russ LLP

(57) ABSTRACT

A method for reconstructing a defect includes: S1, establishing a database of magnetic flux leakage signals of a unit defect and acquiring a magnetic flux leakage signal of the unit defect; S2, acquiring a target magnetic flux leakage signal; S3, initially setting a scaling factor k; S4, constructing a forward model; S5, inputting the k into the forward model and performing forward prediction according to the k to acquire a predicted magnetic flux leakage signal for the defect to be detected; S6, calculating an error between the target magnetic flux leakage signal and the predicted magnetic flux leakage signal, and determining whether the error is smaller than an error threshold ε, if yes, executing S7; otherwise, executing S5 after the k is corrected; and S7, scaling the unit defect according to the k to acquire a final size of the defect to be detected.

18 Claims, 2 Drawing Sheets

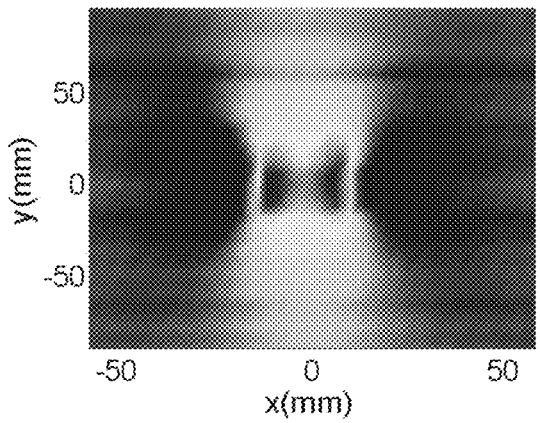
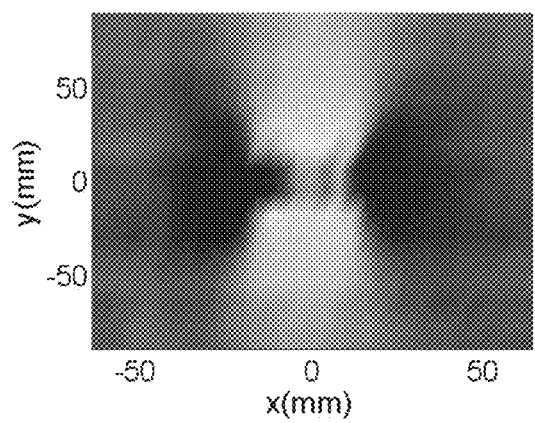
Fig. 3(a)  Fig. 3(b)
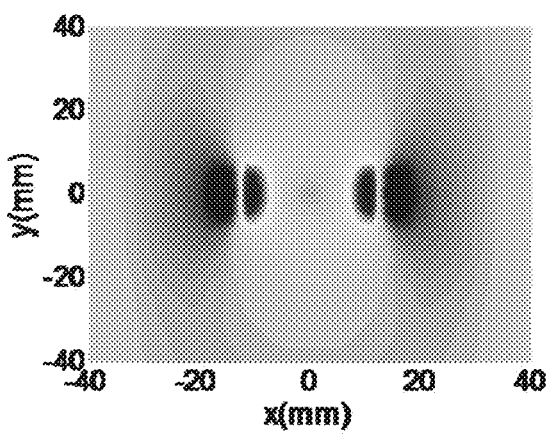
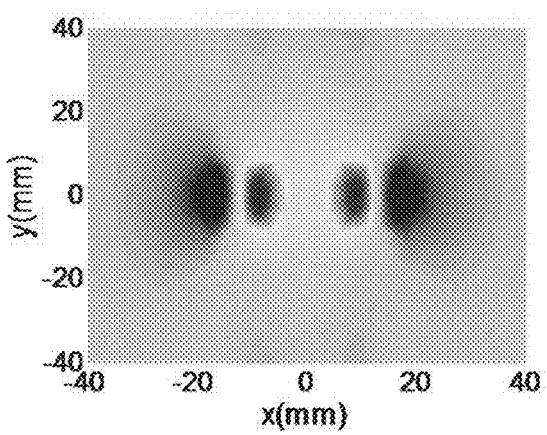
Fig. 4(a)  Fig. 4(b)

METHOD FOR RECONSTRUCTING DEFECT

CROSS-REFERENCE TO RELATED APPLICATION

This application claims priority to and benefits of Chinese Patent Application Serial No. 201710174666.2, filed with the State Intellectual Property Office of P. R. China on Mar. 22, 2017, the entire content of which is incorporated herein by reference.

FIELD

The present disclosure relates to the field of non-destructive detection, and more particularly to a method for reconstructing a defect.

BACKGROUND

Magnetic flux leakage detection is a common non-destructive detection technology and is widely used in the safety detection and defect evaluation of an article including ferromagnetic materials, such as a tank floor, an oil-gas pipeline and a steel wire rope. Reconstructing a size of a defect by the detected magnetic flux leakage signal is an important part of the magnetic flux leakage detection technology. However, due to complex non-linear relationship between the size of the defect and the magnetic flux leakage signal, reconstruction of the defect has become a difficult and hot issue in the current research of the magnetic flux leakage detection technology. The existing method for reconstructing the defect has a low reconstruction precision, a complex calculation model or needs long calculation time, thus resulting in an inefficient reconstruction.

In the related art, for example, in a method for quantifying corrosion defects by magnetic flux leakage detection, although the size of the defect may be directly reconstructed by using a quantification formula, the constructed formula model is too simple to reflect the complex non-linear relationship between the size of the defect and the signal, thus resulting in a low reconstruction precision. For another example, in a method for quantifying and displaying a defect by the magnetic flux leakage detection with incomplete signals, although a fast inversion for the size of the defect may be realized by training a neural network, the model relies on empirical data and has a weak generalization ability and a low reconstruction precision. For yet another example, in a method and device for reconstructing a defect by a three-dimensional magnetic flux leakage detection, although a forward model may be constructed by a finite element method and defect contour reconstruction may be achieved through a iteration, a finite element calculation is required in each iteration, leaving a long calculation time and a low efficiency.

SUMMARY

The present disclosure seeks to solve at least one of the problems that exist in the related art to at least some extent.

For this, according to a first aspect of the present disclosure, a method for reconstructing a defect is provided, the method includes:

S1, establishing a database of magnetic flux leakage signals of a unit defect and acquiring a magnetic flux leakage signal $H^{(a_0,b_0,c_0)}(x, y, z_0)$ of the unit defect;

S2, acquiring as a target magnetic flux leakage signal $H^{tar}(x, y, z_0)$ a magnetic flux leakage signal of a defect to be detected of an article;

S3, initially setting a scaling factor k.

S4, constructing a forward model:

S5, inputting the scaling factor k into the forward model and performing a forward prediction according to the scaling factor k to acquire a predicted magnetic flux leakage signal $H^{(ka_0,kb_0,kc_0)}(x, y, z_0)$ for the defect to be detected;

S6, calculating an error E between the target magnetic flux leakage signal $H^{tar}(x, y, z_0)$ and the predicted magnetic flux leakage signal $H^{(ka_0,kb_0,kc_0)}(x, y, z_0)$, and determining whether the error E is smaller than an error threshold ε, if yes, executing S7; otherwise, executing S5 after the scaling factor k is corrected; and S7, scaling the unit defect according to the scaling factor k to acquire a final size of the defect to be detected.

In an embodiment of the present disclosure, the unit defect is a rectangular defect with a length of $a_0$ in a magnetization direction, a width of $b_0$ in a width direction of the unit defect, and a depth of $c_0$ in a thickness direction of the article, where $a_0$, $b_0$, and $c_0$ are known.

In an embodiment of the present disclosure, the unit defect includes a pinhole unit defect ($0<a_0<t$, $0<b_0<t$), a pit unit defect ($t\leq a_0<3t$, $t\leq b_0<3t$), a tangential recess unit defect ($0<a_0<t$, $b_0\geq t$), a tangential groove unit defect ($t\leq a_0<3t$, $b_0\geq 3t$), a horizontal recess unit defect ($a_0\geq t$, $0<b_0<t$), a horizontal groove unit defect ($a_0\geq 3t$, $t\leq b_0<3t$) and a common unit defect ($a_0\geq 3t$, $b_0\geq 3t$), where t is a thickness of the article.

In an embodiment of the present disclosure, the magnetic flux leakage signal $H^{(a_0,b_0,c_0)}(x, y, z_0)$ of the unit defect is acquired by a finite element simulation or a magnetic flux leakage detection test, or is solved with an analytical model.

In an embodiment of the present disclosure, the magnetic flux leakage signal $H^{(a_0,b_0,c_0)}(x, y, z_0)$ of the unit defect and the target magnetic flux leakage signal $H^{tar}(x, y, z_0)$ are magnetic flux leakage signals in a detection plane $(x, y, z_0)$ under a same preset lift-off value $z_0$, in which the magnetic flux leakage signal is a horizontal component signal of a leakage magnetic field in a magnetization direction, a tangential component signal of the leakage magnetic field, or a normal component signal of the leakage magnetic field.

In an embodiment of the present disclosure, $0.5 \leq k \leq 5$.

In an embodiment of the present disclosure, constructing the forward model includes:

a. performing a scaling transformation on a detection plane for the magnetic flux leakage signal $H^{(a_0,b_0,c_0)}(x, y, z_0)$ of the unit defect to acquire a transformed magnetic flux leakage signal $H^{(ka_0,kb_0,kc_0)}(kx,ky,kz_0)$, and performing an interpolation in a detection plane $(x,y,kz_0)$ on the transformed magnetic flux leakage signal $H^{(ka_0,kb_0,kc_0)}(kx,ky,kz_0)$, so as to acquire an interpolated magnetic flux leakage signal $H^{(ka_0,kb_0,kc_0)}(x,y,kz_0)$; and b. performing a lift-off value correction on the interpolated magnetic flux leakage signal $H^{(ka_0,kb_0,kc_0)}(x,y,kz_0)$ to acquire a corrected magnetic flux leakage signal $H^{(ka_0,kb_0,kc_0)}(x, y, z_0)$, in which the interpolated magnetic flux leakage signal $H^{(ka_0,kb_0,kc_0)}(x,y,kz_0)$ and the corrected magnetic flux leakage signal $H^{(ka_0,kb_0,kc_0)}(x, y, z_0)$ after subjecting to a two-dimensional Fourier transformation satisfy a following equation in a frequency domain:

$$\tilde{H}^{(ka_0,kb_0,kc_0)}(\alpha, \beta, z_0) = \tilde{H}^{(ka_0,kb_0,kc_0)}(\alpha, \beta, kz_0)e^{(k-1)z_0\sqrt{\alpha^2+\beta^2}},$$

where α and β are Fourier variables in an x direction and a y direction, respectively.

In an embodiment of the present disclosure, the error E between the target magnetic flux leakage signal $H^{tar}(x, y, z_0)$ and the predicted magnetic flux leakage signal $H^{(ka_0,kb_0,kc_0)}(x, y, z_0)$ satisfies a following equation:

$$E = \frac{\|H^{(ka_0,kb_0,kc_0)}(x, y, z_0) - H^{tar}(x, y, z_0)\|}{\|H^{tar}(x, y, z_0)\|},$$

where the error threshold e is a preset value, and $0 < \varepsilon \ll 1$.

In an embodiment of the present disclosure, scaling the unit defect according to the scaling factor k further includes:

scaling a length $a_0$, a width $b_0$ and a depth $c_0$ of the unit defect k times according to the scaling factor k to acquire a length $ka_0$, a width $kb_0$ and a depth $kc_0$ of the defect to be detected.

In an embodiment of the present disclosure, the article includes a ferromagnetic material.

According to a second aspect of the present disclosure, a device for reconstructing a defect is provided. The device includes a processor, and a memory for storing instructions executable by the processor, in which the processor is configured to perform the method for reconstructing a defect according to the first aspect of the present disclosure.

According to a third aspect of the present disclosure, a non-transitory computer-readable storage medium is provided having stored therein instructions that, when executed by a processor of a mobile terminal, causes the mobile terminal to perform a method for reconstructing a defect according to the first aspect of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings as described below.

FIGS. 3(a)-3(b) are diagrams showing magnetic flux leakage signals of an actual defect with a length of 28.6 mm, a width of 28.6 mm and a depth of 5.8 mm and magnetic flux leakage signals of an inversed defect according to an embodiment of the present disclosure; and FIGS. 4(a)-4(b) are diagrams showing simulation magnetic flux leakage signals of a defect with a length of 24 mm, a width of 12 mm and a depth of 2.4 mm and inversion magnetic flux leakage signals according to an embodiment of the present disclosure.

DETAILED DESCRIPTION

Figure 1:
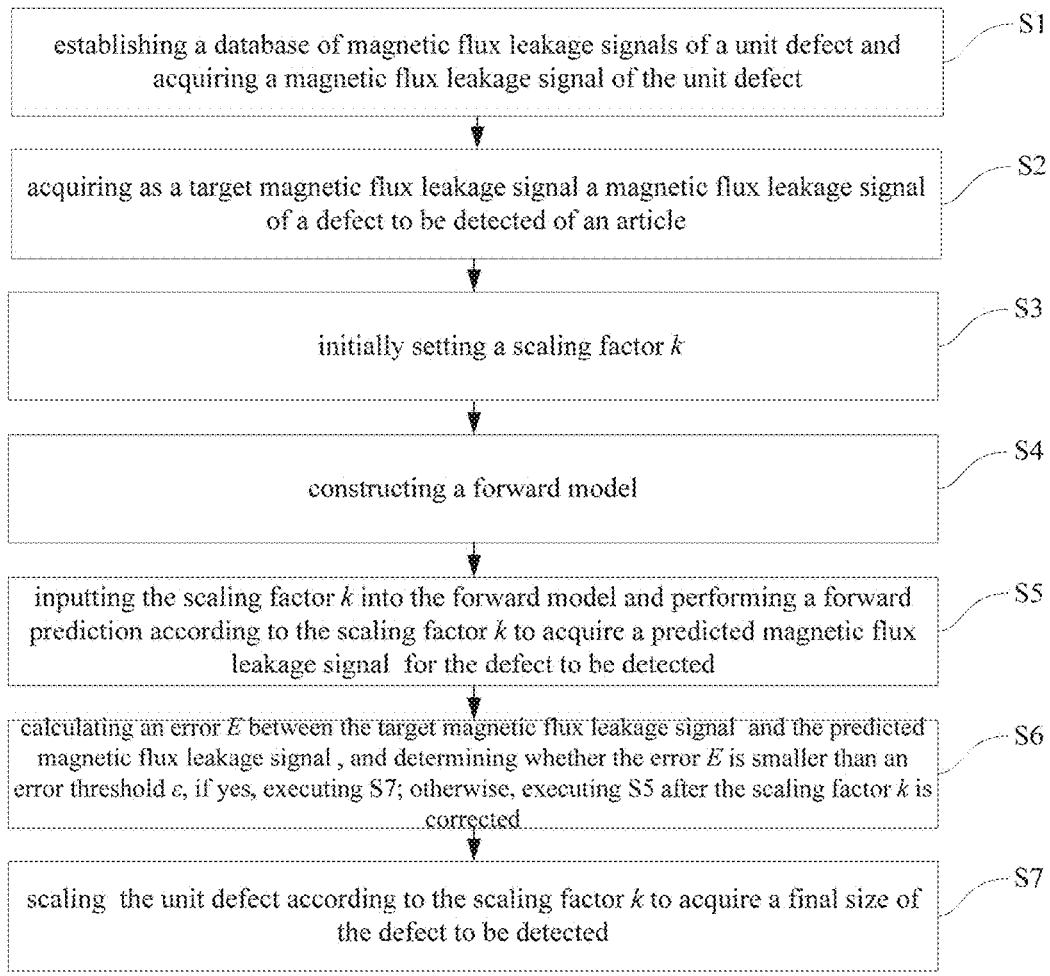
FIG. 1 is a flow chart of a method for reconstructing a defect according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the following, a method for reconstructing a defect according to an embodiment of the present disclosure is described with reference to the accompanying drawings.

FIG. 1 is a flow chart of a method for reconstructing a defect according to an embodiment of the present disclosure. As shown in FIG. 1, the method includes the following steps.

At S1, a database of magnetic flux leakage signals of a unit defect is established and a magnetic flux leakage signal $H^{(a_0,b_0,c_0)}(x, y, z_0)$ of the unit defect is acquired.

In an embodiment of the present disclosure, the unit defect is a rectangular defect with a length of $a_0$ in a magnetization direction, a width of $b_0$ in a width direction of the unit defect, and a depth of $c_0$ in a thickness direction of an article, where $a_0$, $b_0$, and $c_0$ are known.

Figure 2:
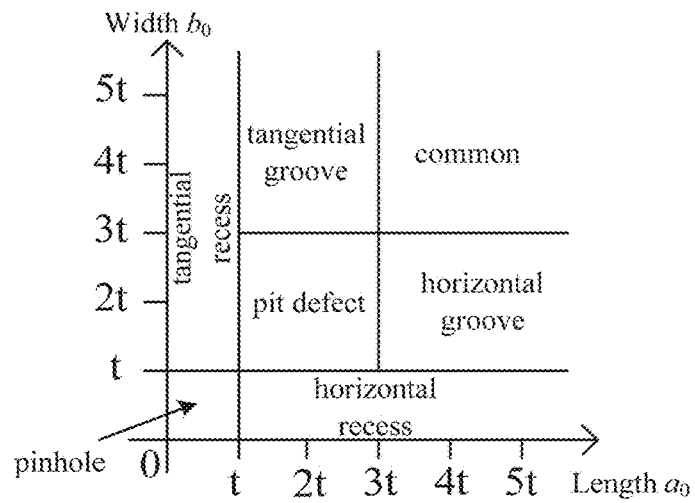
FIG. 2 is a schematic diagram of unit defect classification of a database of magnetic flux leakage signals of unit defects according to an embodiment of the present disclosure.

Based on this, as shown in FIG. 2, the database of magnetic flux leakage signals of the unit defect includes such as seven unit defects which are a pinhole unit defect ($0 < a_0 < t$, $0 < b_0 < t$), a pit unit defect ($t \leq a_0 < 3t$, $t \leq b_0 < 3t$), a tangential recess unit defect ($0 < a_0 < t$, $b_0 \geq t$), a tangential groove unit defect ($t \leq a_0 < 3t$, $b_0 \geq 3t$), a horizontal recess unit defect ($a_0 \geq t$, $0 < b_0 < t$), a horizontal groove unit defect ($a_0 \geq 3t$, $t \leq b_0 < 3t$) and a common unit defect ($a_0 \geq 3t$, $b_0 \geq 3t$), where t is a thickness of the article.

In an embodiment of the present disclosure, the magnetic flux leakage signal $H^{(a_0,b_0,c_0)}(x, y, z_0)$ of the unit defect may be acquired by a finite element simulation or a magnetic flux leakage detection test, or is solved with an analytical model.

At S2, a magnetic flux leakage signal of a defect to be detected of an article is acquired as a target magnetic flux leakage signal $H^{tar}(x, y, z_0)$.

In an embodiment of the present disclosure, the magnetic flux leakage signal $H^{(a_0,b_0,c_0)}(x, y, z_0)$ of the unit defect and the target magnetic flux leakage signal $H^{tar}(x, y, z_0)$ are magnetic flux leakage signals in a detection plane $(x, y, z_0)$ under a same preset lift-off value $z_0$, in which the magnetic flux leakage signal may be a horizontal component signal of a leakage magnetic field in a magnetization direction, a tangential component signal of the leakage magnetic field, or a normal component signal of the leakage magnetic field.

At S3, a scaling factor k is initially set.

Specifically, the scaling factor k is a variable having a certain range. In an embodiment of the present disclosure, for example, 0.5≤k≤5.

At S4, a forward model is constructed. Input of the forward model is the scaling factor k, and output of the forward model is a predicted magnetic flux leakage signal, which is such a signal that is scaled according to scaling factor k.

Specifically, constructing the forward model in S4 includes:

a. performing a scaling transformation on a detection plane for the magnetic flux leakage signal $H^{(a_0,b_0,c_0)}(x, y, z_0)$ of the unit defect to acquire a transformed magnetic flux leakage signal $H^{(ka_0,kb_0,kc_0)}(kx,ky,kz_0)$, and performing an interpolation in a detection plane $(x,y,kz_0)$ on the transformed magnetic flux leakage signal $H^{(ka_0,kb_0,kc_0)}(kx,ky,kz_0)$, so as to acquire an interpolated magnetic flux leakage signal $H^{(ka_0,kb_0,kc_0)}(x,y,kz_0)$; and b. performing a lift-off value correction on the interpolated magnetic flux leakage signal $H^{(ka_0,kb_0,kc_0)}(x,y,kz_0)$ to acquire a corrected magnetic flux leakage signal $H^{(ka_0,kb_0,kc_0)}(x, y, z_0)$, in which the interpolated magnetic flux leakage signal $H^{(ka_0,kb_0,kc_0)}(x,y,kz_0)$ and the corrected magnetic flux leakage signal $H^{(ka_0,kb_0,kc_0)}(x, y, z_0)$ after subjecting to a two-dimensional Fourier transformation satisfy a following equation in a frequency domain:

$$\tilde{H}^{(ka_0,kb_0,kc_0)}(\alpha, \beta, z_0) = \tilde{H}^{(ka_0,kb_0,kc_0)}(\alpha, \beta, kz_0)e^{(k-1)z_0\sqrt{\alpha^2+\beta^2}},$$

where α and β are Fourier variables in an x direction and a y direction, respectively.

At S5, the scaling factor k is input into the forward model and a forward prediction is performed according to the scaling factor k to acquire a predicted magnetic flux leakage signal $H^{(ka_0,kb_0,kc_0)}(x, y, z_0)$ for the defect to be detected.

At S6, an error E between the target magnetic flux leakage signal $H^{tar}(x, y, z_0)$ and the predicted magnetic flux leakage signal $H^{(ka_0,kb_0,kc_0)}(x, y, z_0)$ is calculated, and whether the error E is smaller than an error threshold ε is determined, if yes, S7 is executed; otherwise, S5 is executed after the scaling factor k is corrected. In other words, if the error E between the target magnetic flux leakage signal and the predicted magnetic flux leakage signal is less than the error threshold ε, the unit defect is scaled to acquire a final size of the defect to be detected; otherwise, the scaling factor k is corrected and an iterative operation is continued until the error E is less than the error threshold ε.

In an embodiment of the present disclosure, the error E between the target magnetic flux leakage signal $H^{tar}(x, y, z_0)$ and the predicted magnetic flux leakage signal $H^{(ka_0,kb_0,kc_0)}(x, y, z_0)$ satisfy a following equation:

$$E = \frac{\|H^{(ka_0,kb_0,kc_0)}(x, y, z_0) - H^{tar}(x, y, z_0)\|}{\|H^{tar}(x, y, z_0)\|},$$

where the error threshold e is a preset value, and 0<ε<<1.

At S7, the unit defect is scaled according to the scaling factor k to acquire a final size of the defect to be detected.

Specifically, scaling the unit defect according to the scaling factor k in S7 further includes: scaling a length $a_0$, a width $b_0$ and a depth $c_0$ of the unit defect k times according to the scaling factor k to acquire a length $ka_0$, a width $kb_0$ and a depth $kc_0$ of the defect to be detected.

In an embodiment of the present disclosure, the article includes a ferromagnetic material.

To sum up, with the method for reconstructing a defect according to embodiments of the present disclosure, the forward model is constructed as a prediction model of the magnetic flux leakage signal and is applied in an iterative loop, the scaling factor is continuously corrected until the error between the target magnetic flux leakage signal and the predicted magnetic flux leakage signal is less than the error threshold, and finally the size of the defect to be detected is acquired.

Therefore, the defect may be effectively inversed by the method according to embodiments of the present disclosure with a reduced calculation time and an improved solving precision, and the method according to embodiment of the present disclosure has a wide application prospect.

In order to facilitate a better understanding of the present disclosure, the method for reconstructing a defect according to embodiments of the present disclosure will be described in detail with reference to the accompanying drawings and specific examples.

Example 1

In this example, the method for reconstructing a defect includes the following steps.

At S1, a database of magnetic flux leakage signals of a unit defect is established and a magnetic flux leakage signal $H^{(a_0,b_0,c_0)}(x, y, z_0)$ of the unit defect is acquired. Here, the unit defect is a rectangular defect with a known size. For example, a pit unit defect is selected, which has a length $a_0$ of 14.3 mm, a width $b_0$ of 14.3 mm, and a depth $c_0$ of 2.9 mm. The magnetic flux leakage signal of the unit defect is acquired by performing a magnetic flux leakage detection test on a defect artificially excavated in a test pipeline having a wall thickness t of 14.3 mm.

At S2, a magnetic flux leakage signal of a defect to be detected of an article including for example a ferromagnetic material is acquired as a target magnetic flux leakage signal $H^{tar}(x, y, z_0)$. The defect to be detected is a defect artificially excavated in the test pipeline, and has a length a of 28.6 mm, a width b of 28.6 mm, a depth c of 5.8 mm. The magnetic flux leakage signal of the defect to be detected is acquired by performing the magnetic flux leakage detection test. The magnetic flux leakage signal $H^{(a_0,b_0,c_0)}(x, y, z_0)$ of the unit defect and the target magnetic flux leakage signal $H^{tar}(x, y, z_0)$ are horizontal component signals of a leakage magnetic field in a magnetization direction in a detection plane $(x, y, z_0)$ under a same preset lift-off value $z_0$ of 2 mm.

At S3, a scaling factor k is initially set to be 1, and 0.5≤k≤5.

At S4, a forward model is constructed. Input of the forward model is the scaling factor k, and output of the forward model is a predicted magnetic flux leakage signal, which is such a signal that is scaled according to scaling factor k. Specifically, constructing the forward model includes:

a. performing a scaling transformation on a detection plane for the magnetic flux leakage signal $H^{(a_0,b_0,c_0)}(x, y, z_0)$ of the unit defect to acquire a transformed magnetic flux leakage signal $H^{(ka_0,kb_0,kc_0)}(kx,ky,kz_0)$, and performing an interpolation in a detection plane $(x,y,kz_0)$ on the transformed magnetic flux leakage signal $H^{(ka_0,kb_0,kc_0)}(kx,ky,kz_0)$, so as to acquire an interpolated magnetic flux leakage signal $H^{(ka_0,kb_0,kc_0)}(x,y,kz_0)$; and b. performing a lift-off value correction on the interpolated magnetic flux leakage signal $H^{(ka_0,kb_0,kc_0)}(x,y,kz_0)$ to acquire a corrected magnetic flux leakage signal $H^{(ka_0,kb_0,kc_0)}(x, y, z_0)$, in which the interpolated magnetic flux leakage signal $H^{(ka_0,kb_0,kc_0)}(x,y,kz_0)$ and the corrected magnetic flux leakage signal $H^{(ka_0,kb_0,kc_0)}(x, y, z_0)$ after subjecting to a two-dimensional Fourier transformation satisfy a following equation in a frequency domain:

$$\tilde{H}^{(ka_0,kb_0,kc_0)}(\alpha, \beta, z_0) = \tilde{H}^{(ka_0,kb_0,kc_0)}(\alpha, \beta, kz_0)e^{(k-1)z_0\sqrt{\alpha^2+\beta^2}},$$

where $\alpha$ and $\beta$ are Fourier variables in an x direction and a y direction, respectively.

At S5, the scaling factor k is input into the forward model and a forward prediction is performed according to the scaling factor k to acquire a predicted magnetic flux leakage signal $H^{(ka_0,kb_0,kc_0)}(x, y, z_0)$ for the defect to be detected.

At S6, an error E between the target magnetic flux leakage signal $H^{tar}(x, y, z_0)$ and the predicted magnetic flux leakage signal $H^{(ka_0,kb_0,kc_0)}(x, y, z_0)$ is calculated according to the following equation:

$$E = \frac{\|H^{(ka_0,kb_0,kc_0)}(x, y, z_0) - H^{tar}(x, y, z_0)\|}{\|H^{tar}(x, y, z_0)\|},$$

and whether the error E is smaller than an error threshold $\varepsilon$ is determined, if yes, the S7 below is executed; otherwise, the S5 above is executed after the scaling factor k is corrected.

At S7, the unit defect is scaled according to the scaling factor k, and the length $a_0$ of 14.3 mm, the width $b_0$ of 14.3 mm and the depth $c_0$ of 2.9 mm of the unit defect are scaled k times according to the scaling factor k to acquire a length $ka_0$, a width $kb_0$ and a depth $kc_0$ of the defect, therefore acquiring a final size of the defect to be detected.

In this example, the scaling factor k final acquired is 1.907, and an average relative error MRE is 4.88%, that is, the final reconstructed defect has a length a of 22.9 mm, a width b of 22.9 mm, and a depth c of 2.29 mm. FIGS. 3(a) and 3(b) show a target magnetic flux leakage signal of the defect to be detected and a final predicted signal with the forward model, respectively. It can be seen that, the defects of the article including the ferromagnetic material may be effectively inversed by the method according to embodiments of the present disclosure with an improved calculation speed, without reducing the solving precision.

Example 2

In this example, the method for reconstructing a defect includes the following steps.

At S1, a database of magnetic flux leakage signals of a unit defect is established and a magnetic flux leakage signal $H^{(a_0,b_0,c_0)}(x, y, z_0)$ of the unit defect is acquired. Here, the unit defect is a rectangular defect with a known size. For example, a horizontal recess unit defect is selected, which has a length $a_0$ of 12 mm, a width $b_0$ of 6 mm, and a depth $c_0$ of 1.2 mm. The magnetic flux leakage signal of the unit defect is acquired by performing a simulation test with a constructed finite element simulation module, and a thickness t of an article including for example a ferromagnetic material for construction is 12 mm.

At S2, a magnetic flux leakage signal of a defect to be detected of the article including the ferromagnetic material is acquired as a target magnetic flux leakage signal $H^{tar}(x, y, z_0)$, and the defect to be detected has a length a of 24 mm, a width b of 12 mm, and a depth c of 2.4 mm. The magnetic flux leakage signal of the defect to be detected is acquired by performing a simulation test with a constructed finite element simulation module. The magnetic flux leakage signal $H^{(a_0,b_0,c_0)}(x, y, z_0)$ of the unit defect and the target magnetic flux leakage signal $H^{tar}(x, y, z_0)$ are horizontal component signals of a leakage magnetic field in a magnetization direction in a detection plane (x, y, $z_0$) under a same preset lift-off value $z_0$ of 2 mm.

At S3, a scaling factor k is initially set to be 1, and $0.5 \leq k \leq 5$.

At S4, a forward model is constructed. Input of the forward model is the scaling factor k, and output of the forward model is a predicted magnetic flux leakage signal, which is such a signal that is scaled according to scaling factor k. Specifically, constructing the forward model includes:

S4.1. performing a scaling transformation on a detection plane for the magnetic flux leakage signal $H^{(a_0,b_0,c_0)}(x, y, z_0)$ of the unit defect to acquire a transformed magnetic flux leakage signal $H^{(ka_0,kb_0,kc_0)}(kx,ky,kz_0)$, and performing an interpolation in a detection plane (x,y,$kz_0$) on the transformed magnetic flux leakage signal $H^{(ka_0,kb_0,kc_0)}(kx,ky,kz_0)$, so as to acquire an interpolated magnetic flux leakage signal $H^{(ka_0,kb_0,kc_0)}(x,y,kz_0)$; and S4.2. performing a lift-off value correction on the interpolated magnetic flux leakage signal $H^{(ka_0,kb_0,kc_0)}(x,y,kz_0)$ to acquire a corrected magnetic flux leakage signal $H^{(ka_0,kb_0,kc_0)}(x, y, z_0)$, in which the interpolated magnetic flux leakage signal $H^{(ka_0,kb_0,kc_0)}(x,y,kz_0)$ and the corrected magnetic flux leakage signal $H^{(ka_0,kb_0,kc_0)}(x, y, z_0)$ after subjecting to a two-dimensional Fourier transformation satisfy a following equation in a frequency domain:

$$\tilde{H}^{(ka_0,kb_0,kc_0)}(\alpha, \beta, z_0) = \tilde{H}^{(ka_0,kb_0,kc_0)}(\alpha, \beta, kz_0)e^{(k-1)z_0\sqrt{\alpha^2+\beta^2}},$$

where $\alpha$ and $\beta$ are Fourier variables in an x direction and a y direction, respectively.

At S5, the scaling factor k is input into the forward model and a forward prediction is performed according to the scaling factor k to acquire a predicted magnetic flux leakage signal $H^{(ka_0,kb_0,kc_0)}(x, y, z_0)$ for the defect to be detected.

At S6, an error E between the target magnetic flux leakage signal $H^{tar}(x, y, z_0)$ and the predicted magnetic flux leakage signal $H^{(ka_0,kb_0,kc_0)}(x, y, z_0)$ is calculated according to the following equation:

$$E = \frac{\|H^{(ka_0,kb_0,kc_0)}(x, y, z_0) - H^{tar}(x, y, z_0)\|}{\|H^{tar}(x, y, z_0)\|},$$

and whether the error E is smaller than an error threshold $\varepsilon$ is determined, if yes, the S7 below is executed; otherwise, the S5 above is executed after the scaling factor k is corrected.

At S7, the unit defect is scaled according to the scaling factor k, and the length $a_0$ of 12 mm, the width $b_0$ of 6 mm and the depth $c_0$ of 1.2 mm of the unit defect are scaled k times according to the scaling factor k to acquire a length $ka_0$, a width $kb_0$ and a depth $kc_0$ of the defect, therefore acquiring a final size of the defect to be detected.

In this example, the scaling factor k final acquired is 1.968, and an average relative error MRE is 1.63%, that is, the final reconstructed defect has a length a of 23.6 mm, a width b of 11.8 mm, and a depth c of 2.36 mm. FIGS. 4(a) and 4(b) show a target magnetic flux leakage signal of the defect to be detected and a final predicted signal with the forward model, respectively. It can be seen that, the defects of the article including the ferromagnetic material may be effectively inversed by the method according to embodiments of the present disclosure with a fast calculation speed and a high solving precision.

In an embodiment of the present disclosure, a device for reconstructing a defect is provided. The device includes a processor, and a memory for storing instructions executable by the processor, in which the processor is configured to perform the method for reconstructing a defect as described hereinbefore.

In an embodiment of the present disclosure, a non-transitory computer-readable storage medium is provided having stored therein instructions that, when executed by a processor of a mobile terminal, causes the mobile terminal to perform the method for reconstructing a defect as described hereinbefore.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is defined by the claims and the like.

What is claimed is:

1. A method for reconstructing a defect, comprising:
S1, establishing a database of magnetic flux leakage signals of a unit defect and acquiring a magnetic flux leakage signal $H^{(a_0,b_0,c_0)}$ (x, y, $z_0$) of the unit defect;
S2, acquiring as a target magnetic flux leakage signal $H^{tar}$ (x, y, $z_0$) a magnetic flux leakage signal of a defect of an article using a sensor;
S3, initially setting a scaling factor k;
S4, constructing a forward model;
S5, inputting the scaling factor k into the forward model and performing a forward prediction according to the scaling factor k to acquire a predicted magnetic flux leakage signal $H^{(ka_0,kb_0,kc_0)}$ (x, y, $z_0$) for the defect;
S6, calculating an error E between the target magnetic flux leakage signal $H^{tar}$ (x, y, $z_0$) and the predicted magnetic flux leakage signal $H^{(ka_0,kb_0,kc_0)}$ (x, y, $z_0$), and determining whether the error E is smaller than an error threshold ε, if yes, executing S7; otherwise, executing S5 after the scaling factor k is corrected; and
S7, scaling the unit defect according to the scaling factor k to acquire a final size of the defect, comprising scaling a length $a_0$, a width $b_0$ and a depth $c_0$ of the unit defect k times according to the scaling factor k to acquire a length $ka_0$, a width $kb_0$ and a depth $kc_0$ of the defect;
wherein a repeated finite element calculation is avoided, thereby improving calculation speed and conserving resources of a processor performing the method.

2. The method according to claim 1, wherein the unit defect is a rectangular defect with a length of $a_0$ in a magnetization direction, a width of $b_0$ in a width direction of the unit defect, and a depth of $c_0$ in a thickness direction of the article, where $a_0$, $b_0$, and $c_0$ are known.

3. The method according to claim 2, wherein the unit defect comprises a pinhole unit defect ($0<a_0<t$, $0<b_0<t$), a pit unit defect ($t \le a_0<3t$, $t \le b_0<3t$), a tangential recess unit defect ($0<a_0<t$, $b_0 \ge t$), a tangential groove unit defect ($t \le a_0<3t$, $b_0 \ge 3t$), a horizontal recess unit defect ($a_0 \ge t$, $0<b_0<t$), a horizontal groove unit defect ($a_0 \ge 3t$, $t \le b_0<3t$) and a common unit defect ($a_0 \ge 3t$, $b_0 \ge 30$), where t is a thickness of the article.

4. The method according to claim 1, wherein the magnetic flux leakage signal) $H^{(a_0,b_0,c_0)}$ (x, y, $z_0$) of the unit defect is acquired by a finite element simulation or a magnetic flux leakage detection test, or is solved with an analytical model.

5. The method according to claim 1, wherein the magnetic flux leakage signal) $H^{(a_0,b_0,c_0)}$ (x, y, $z_0$) of the unit defect and the target magnetic flux leakage signal $H^{tar}$ (x, y, $z_0$) are magnetic flux leakage signals in a detection plane (x, y, $z_0$) under a same preset lift-off value $z_0$, in which the magnetic flux leakage signal is a horizontal component signal of a leakage magnetic field in a magnetization direction, a tangential component signal of the leakage magnetic field, or a normal component signal of the leakage magnetic field.

6. The method according to claim 1, wherein $0.5 \le k \le 5$.

7. The method according to claim 1, wherein constructing the forward model comprises:
a. performing a scaling transformation on a detection plane for the magnetic flux leakage signal $H^{(a_0,b_0,c_0)}$ (x, y, $z_0$) of the unit defect to acquire a transformed magnetic flux leakage signal $H^{(ka_0,kb_0,kc_0)}$ (kx, ky, $kz_0$), and performing an interpolation in a detection plane (x, y, $kz_0$) on the transformed magnetic flux leakage signal $H^{(ka_0,kb_0,kc_0)}$ (kx,ky,$kz_0$), so as to acquire an interpolated magnetic flux leakage signal $H^{(ka_0,kb_0,kc_0)}$ (x,y,$kz_0$); and
b. performing a lift-off value correction on the interpolated magnetic flux leakage signal $H^{(ka_0,kb_0,kc_0)}$ (x, y, $kz_0$) to acquire a corrected magnetic flux leakage signal $H^{(ka_0,kb_0,kc_0)}$ (x, y, $z_0$), in which the interpolated magnetic flux leakage signal $H^{(ka_0,kb_0,kc_0)}$ (x, y, $kz_0$) and the corrected magnetic flux leakage signal $H^{(ka_0,kb_0,kc_0)}$ (x,y, $z_0$) after subjecting to a two-dimensional Fourier transformation satisfy a following equation in a frequency domain:

$$\tilde{H}^{(ka_0,kb_0,kc_0)}(\alpha, \beta, z_0) = \tilde{H}^{(ka_0,kb_0,kc_0)}(\alpha, \beta, kz_0) e^{(k-1)z_0 \sqrt{\alpha^2+\beta^2}},$$

where α and β are Fourier variables in an x direction and a y direction, respectively.

8. The method according to claim 1, wherein the error E between the target magnetic flux leakage signal $H^{tar}$ (x, y, $z_0$)

and the predicted magnetic flux leakage signal $H^{(ka_0,kb_0,kc_0)}$ (x, y, $z_0$) satisfies a following equation:

$$E = \frac{\|H^{(ka_0,kb_0,kc_0)}(x, y, z_0) - H^{tar}(x, y, z_0)\|}{\|H^{tar}(x, y, z_0)\|},$$

where the error threshold E is a preset value, and 0<ε<<1.

9. The method according to claim 1, wherein the article comprises a ferromagnetic material.

10. A device for reconstructing a defect, comprising:
a processor; and
a memory for storing instructions executable by the processor;
wherein the processor is configured to perform a method for reconstructing a defect, the method comprising:
S1, establishing a database of magnetic flux leakage signals of a unit defect and acquiring a magnetic flux leakage signal $H^{(a_0,b_0,c_0)}$ (x, y, $z_0$) of the unit defect;
S2, acquiring as a target magnetic flux leakage signal $H^{tar}$ (x, y, $z_0$) a magnetic flux leakage signal of a defect of an article using a sensor;
S3, initially setting a scaling factor k;
S4, constructing a forward model;
S5, inputting the scaling factor k into the forward model and performing a forward prediction according to the scaling factor k to acquire a predicted magnetic flux leakage signal $H^{(ka_0,kb_0,kc_0)}$ (x, y, $z_0$) for the defect;
S6, calculating an error E between the target magnetic flux leakage signal $H^{tar}$ (x, y, $z_0$) and the predicted magnetic flux leakage signal $H^{(ka_0,kb_0,kc_0)}$ (x, y, $z_0$), and determining whether the error E is smaller than an error threshold ε, if yes, executing S7; otherwise, executing S5 after the scaling factor k is corrected; and
S7, scaling the unit defect according to the scaling factor k to acquire a final size of the defect, comprising scaling a length $a_0$, a width $b_0$ and a depth $c_0$ of the unit defect k times according to the scaling factor k to acquire a length $ka_0$, a width $kb_0$ and a depth $kc_0$ of the defect;
wherein a repeated finite element calculation is avoided, thereby improving calculation speed and conserving resources of a processor performing the method.

11. The device according to claim 10, wherein the unit defect is a rectangular defect with a length of $a_0$ in a magnetization direction, a width of $b_0$ in a width direction of the unit defect, and a depth of $c_0$ in a thickness direction of the article, where $a_0$, $b_0$, and $c_0$ are known.

12. The device according to claim 11, wherein the unit defect comprises a pinhole unit defect (0<$a_0$<t, 0<$b_0$<t), a pit unit defect (t≤$a_0$<3t, t≤$b_0$<3t), a tangential recess unit defect (0<$a_0$<3t, $b_0$≥t), a tangential groove unit defect (t≤$a_0$<3t, $b_0$≥3t), a horizontal recess unit defect ($a_0$≥t, 0<$b_0$<t), a horizontal groove unit defect ($a_0$≥3t, t≤$b_0$<3t) and a common unit defect ($a_0$≥3t, $b_0$≥30, where t is a thickness of the article.

13. The device according to claim 10, wherein the magnetic flux leakage signal $H^{(a_0,b_0,c_0)}$ (x, y, $z_0$) of the unit defect is acquired by a finite element simulation or a magnetic flux leakage detection test, or is solved with an analytical model.

14. The device according to claim 10, wherein the magnetic flux leakage signal $H^{(a_0,b_0,c_0)}$ (x, y, $z_0$) of the unit defect and the target magnetic flux leakage signal $H^{tar}$ (x, y, $z_0$) are magnetic flux leakage signals in a detection plane (x, y, $z_0$) under a same preset lift-off value $z_0$, in which the magnetic flux leakage signal is a horizontal component signal of a leakage magnetic field in a magnetization direction, a tangential component signal of the leakage magnetic field, or a normal component signal of the leakage magnetic field.

15. The device according to claim 10, wherein 0.5≤k≤5.

16. The device according to claim 10, wherein constructing the forward model comprises:
a. performing a scaling transformation on a detection plane for the magnetic flux leakage signal $H^{(a_0,b_0,c_0)}$ (x, y, $z_0$) of the unit defect to acquire a transformed magnetic flux leakage signal $H^{(ka_0,kb_0,kc_0)}$ (kx,ky,k$z_0$), and performing an interpolation in a detection plane (x, y, k$z_0$) on the transformed magnetic flux leakage signal $H^{(ka_0,kb_0,kc_0)}$ (kx,ky,k$z_0$), so as to acquire an interpolated magnetic flux leakage signal $H^{(ka_0,kb_0,kc_0)}$ (x,y,k$z_0$); and
b. performing a lift-off value correction on the interpolated magnetic flux leakage signal $H^{(ka_0,kb_0,kc_0)}$ (x, y, k$z_0$) to acquire a corrected magnetic flux leakage signal $H^{(ka_0,kb_0,kc_0)}$ (x, y, $z_0$), in which the interpolated magnetic flux leakage signal $H^{(ka_0,kb_0,kc_0)}$ (x, y, k$z_0$) and the corrected magnetic flux leakage signal $H^{(ka_0,kb_0,kc_0)}$ (x, y, $z_0$) after subjecting to a two-dimensional Fourier transformation satisfy a following equation in a frequency domain:

$$\tilde{H}^{(ka_0,kb_0,kc_0)}(\alpha, \beta, z_0) = \tilde{H}^{(ka_0,kb_0,kc_0)}(\alpha, \beta, kz_0)e^{(k-1)z_0\sqrt{\alpha^2+\beta^2}},$$

where α and β are Fourier variables in an x direction and a y direction, respectively.

17. The device according to claim 10, wherein the error E between the target magnetic flux leakage signal $H^{tar}$ (x, y, $z_0$) and the predicted magnetic flux leakage signal $H^{(ka_0,kb_0,kc_0)}$ (x, y, $z_0$) satisfies a following equation:

$$E = \frac{\|H^{(ka_0,kb_0,kc_0)}(x, y, z_0) - H^{tar}(x, y, z_0)\|}{\|H^{tar}(x, y, z_0)\|},$$

where the error threshold E is a preset value, and 0<ε<<1.

18. A non-transitory computer-readable storage medium having stored therein instructions that, when executed by a processor of a mobile terminal, causes the mobile terminal to perform a method for reconstructing a defect, the method comprising:
S1, establishing a database of magnetic flux leakage signals of a unit defect and acquiring a magnetic flux leakage signal $H^{(a_0,b_0,c_0)}$ (x, y, $z_0$) of the unit defect;
S2, acquiring as a target magnetic flux leakage signal $H^{tar}$ (x, y, $z_0$) a magnetic flux leakage signal of a defect of an article using a sensor;
S3, initially setting a scaling factor k;
S4, constructing a forward model;
S5, inputting the scaling factor k into the forward model and performing a forward prediction according to the scaling factor k to acquire a predicted magnetic flux leakage signal $H^{(ka_0,kb_0,kc_0)}$ (x, y, $z_0$) for the defect;
S6, calculating an error E between the target magnetic flux leakage signal $H^{tar}$ (x, y, $z_0$) and the predicted magnetic flux leakage signal $H^{(ka_0,kb_0,kc_0)}$ (x, y, $z_0$) and determining whether the error E is smaller than an error threshold ε, if yes, executing S7; otherwise, executing S5 after the scaling factor k is corrected; and S7, scaling the unit defect according to the scaling factor k to acquire a final size of the defect, comprising scaling a length $a_0$, a width $b_0$ and a depth $c_0$ of the unit defect k times according to the scaling factor k to acquire a length $ka_0$, a width $kb_0$ and a depth $kc_0$ of the defect;

wherein a repeated finite element calculation is avoided, thereby improving calculation speed and conserving resources of a processor performing the method.

\* \* \* \* \*